Dec. 14, 1971     K. E. STOCKTON ET AL     3,626,673
MEANS FOR SEPARATING FLUIDS
Filed Oct. 26, 1970     4 Sheets-Sheet 1
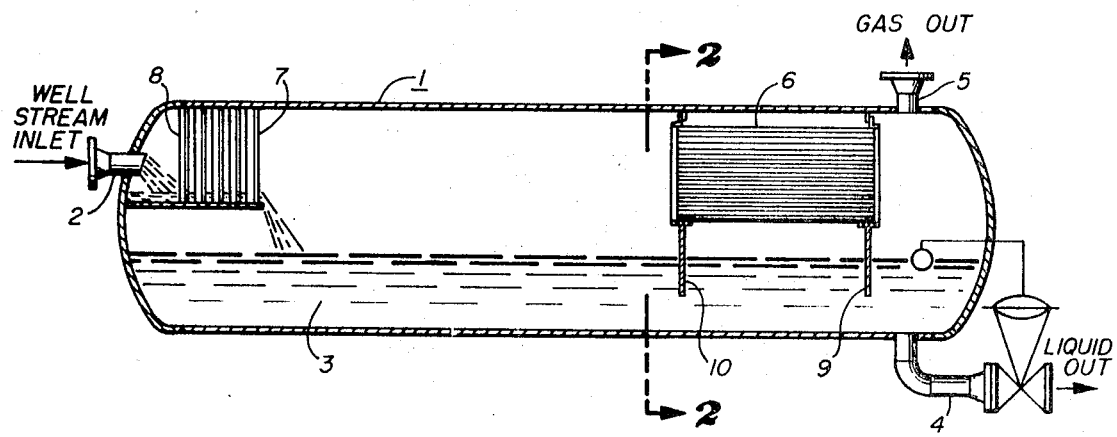
*Fig. 1.*
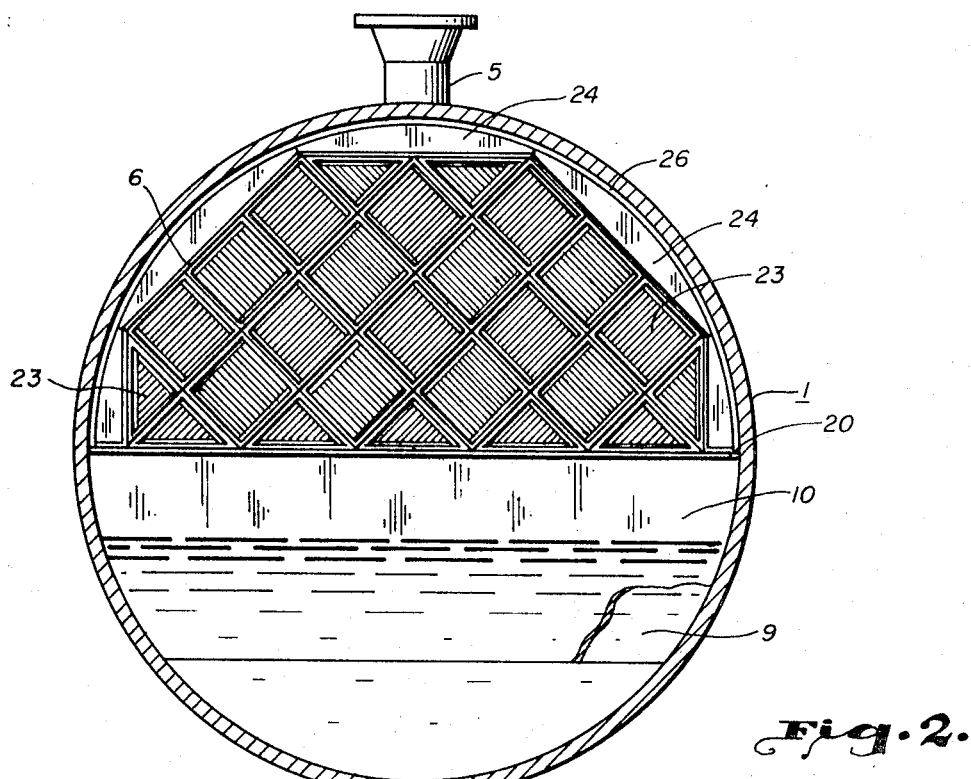
*Fig. 2.*
INVENTORS.
KING E. STOCKTON
ROBERT W. COGGINS
BY
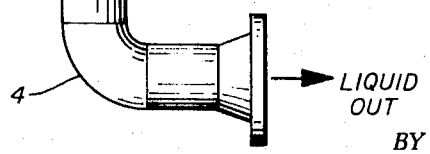
ATTORNEY INVENTORS.
KING E. STOCKTON
ROBERT W. COGGINS
BY Arthur L Wade
ATTORNEY INVENTORS.
KING E. STOCKTON
ROBERT W. COGGINS
BY Arthur L. Wade
ATTORNEY

United States Patent Office 3,626,673
Patented Dec. 14, 1971

3,626,673
MEANS FOR SEPARATING FLUIDS
King E. Stockton and Robert W. Coggins, Tulsa, Okla., assignors to Combustion Engineering, Inc., New York, N.Y.
Filed Oct. 26, 1970, Ser. No. 83,836
Int. Cl. B01d 57/00
U.S. Cl. 55—199                      5 Claims

ABSTRACT OF THE DISCLOSURE

Baffles for vessels through which fluids are passed for phase separation are grouped into modules. The modules are stacked in a vessel to provide passages in which the flow of multi-phasic fluids has its Reynolds number controlled to facilitate separation of the fluid phases.

BACKGROUND OF THE INVENTION

The teachings of U.S. Pat. 2,349,944, issued to P. C. Dixon, May 30, 1944, have successfully guided the design of fluid separators for many years. The advantages of the parallel plate baffles of the Dixon invention within separators, to provide collecting surfaces for the liquids of a gas-liquid mixture, have been generally recognized.

The basic functional advantage of the Dixon plates has been improved while reducing their cost per pound of weight under the recent teachings of U.S. Pat. 3,413,778, issued to Lavery et al. Dec. 3, 1968. Regardless of the baffle, or plate, form used in separators, there is need for a modular construction for selected numbers of the plates which will facilitate at least their fabrication, coating of their vessel, removal for shipping, cleaning, service, repair and replacement.

SUMMARY OF THE INVENTION

A principal object of the invention is to form a framework about a selected number of elongated, parallel plates, or baffles, utilized in a fluid separator vessel to define a module which can be readily mounted within, and removed from, this vessel.

Another object is to provide the modules with cross-sectional geometric shapes which will enable the modules to be stacked to form a unitary body within the separator vessel, which body is sized to provide the desired capacity for liquid and gas throughput of the body.

Another object is to provide a continuous and isolated path within the modules, and from module to module, for liquid collecting on the module plates to drain to the bottom of the separator vessel in which the modules are mounted.

The present invention provides a frame for a selected number of parallel plates which will enable the plates to be handled as a module, combined with other modules to form a unitary body of plates of desired fluid throughput capacity which are readily removable from their vessel.

The invention also provides an arrangement for the plates within their module to form an isolated path for draining liquids downward without re-entrainment of the liquids by the fluids flowing between the plates.

Other objects, advantages and features of this invention will become apparent to one skilled in the art upon consideration of the written specification, appended claims, and attached drawings,. wherein;

FIG. 1 is a sectioned side elevation of a horizontal gas-oil separator with the present invention embodied in its internals;

FIG. 2 is a cross-section of the FIG. 1 separator along lines 2—2;

DESCRIPTION OF THE PREFERRED EMBODIMENT OF THE INVENTION

Figure 3:
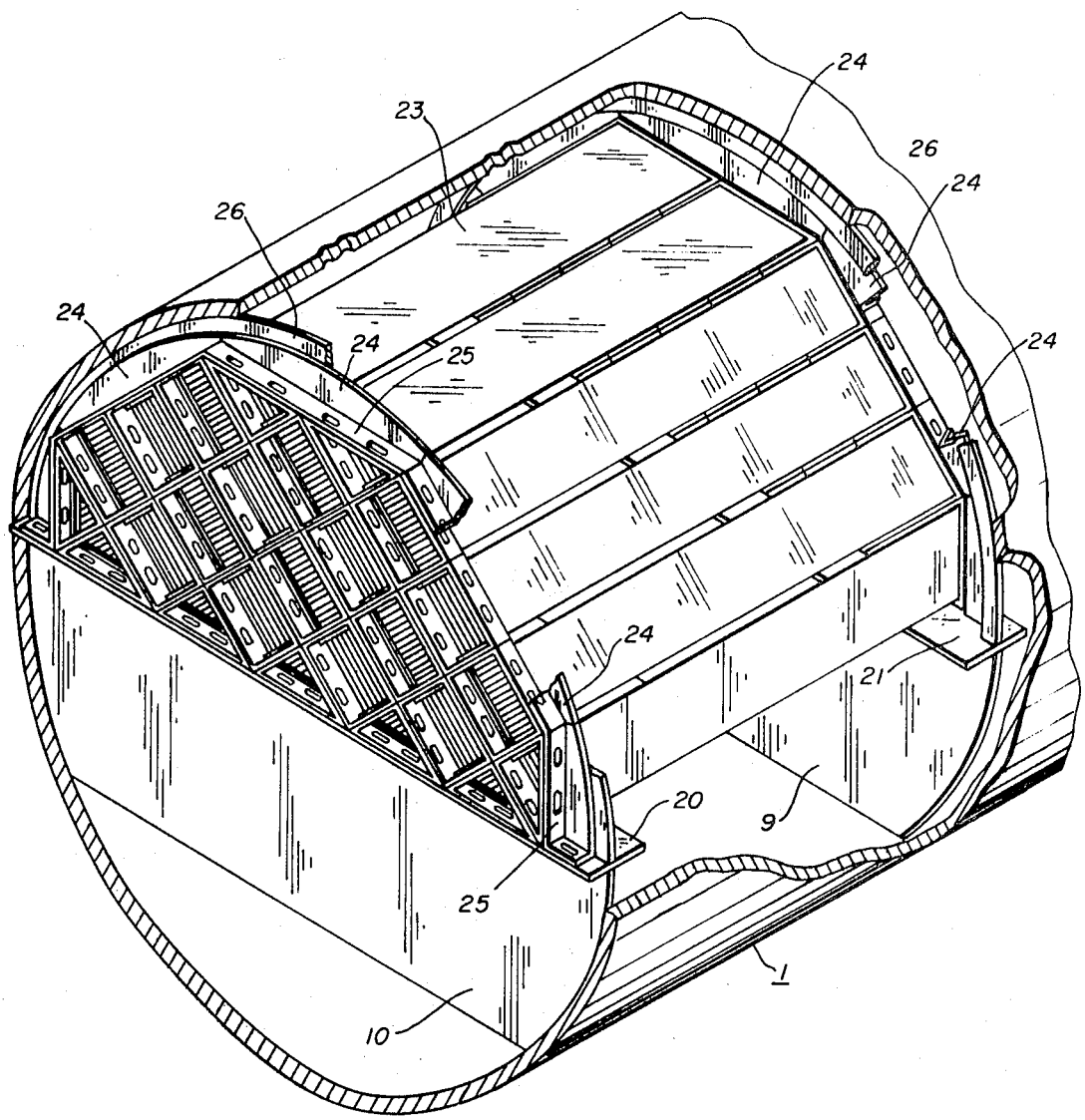
FIG. 3 is a sectioned isometric of the separator of FIG. 1 disclosing the internal plate unit.

The specification of U.S. Pat. 3,413,778 gives a comprehensive analysis of fluid separators. The behavior of liquid drops in a gas phase, reduction of turbulence and foam in general are discussed in sufficient depth to form an adequate background for understanding the invention which obtains a performance above that of structures following the teachings of U.S. Pat. 2,349,944. Although this information relates to all separator structure, particularly separators employing elongated, parallel plates, the present invention is embodied in structure which facilitates the fabrication, shipping and servicing of all separators employing such plates.

The features of the structural embodiment of the invention are disclosed in association with a simple form of separator vessel. No attempt is made to illustrate the details of a completely controlled form of separator. The invention centers about its embodiment in the unit within the separator which facilitates removal of one phase of fluid from another phase. All components of the disclosure are arranged to simply concentrate attention upon this invention embodiment and not waste space upon extraneous disclosure.

FIG. 1 is a two-phase oil and gas separator in which the oil and gas are separated and separately discharged. The oil well production is introduced into vessel 1 through inlet conduit 2. The liquid phase of the production is collected as body 3 and discharged through outlet conduit 4. The gas phase is passed through the internal structure of vessel 1 and discharged through outlet conduit 5. The present invention provides the form of the internal structure 6.

There is a structure 7 mounted within the vessel 1 which the production initially contacts. Unit 7 is essentially formed of baffles 8. Each baffle 8 has, substantially, a V-shaped cross-section, and these baffles are disposed in rows extending transversely of the vessel axis. These baffles have their open sides facing toward the inlet and are staggered with relation to the baffles of the adjacent rows, whereby the fluids striking the baffles are caused to take a circuitous, or tortuous, path around and between the baffles. Free liquid of the biphasic stream will be trapped by the baffles and caused to flow downwardly. The gaseous fluids will pass between the baffles.

Beyond the unit 7, downstream, the major portion of the vessel 1 is occupied by separating module 6. This novel unit is extended across the upper cross-section of the vessel 1. A partition 9 is extended downward from the downstream end of this novel unit to well below the surface of the liquid body 3. A similar partition 10 is extended downward from the upstream end of the unit.

Control of vessel 1 actually refers to regulation of the fluids flowing into the vessel, or out of the vessel, the regulation being specifically by valves in the inlet and outlet conduits. Although not shown, inlet conduit 2 could have a valve mounted in it, regulating the flow of fluid from the upstream source of biphasic production. Outlet conduit 5 could be regulated with a similar valve.

Of more immediate regulatory concern, liquid separated from the production stream collects in body 3. Body 3 is maintained at a desired level, keeping the lower end of partitions 9 and 10 a desired distance below the surface of body 3. A valve is shown in outlet 4, regulated from a float inside vessel 1 and responding to the level of the liquid.

GENERAL SEPARATOR OPERATION

The production flowing into vessel 1 is comprised of gaseous and liquid hydrocarbons. The two phases are to be separated, the gaseous phase discharged through one conduit and the liquid phase discharged through the other conduit.

The initial momentum of the fluids is absorbed with unit. 7. The free liquids are directed toward the lower portion of the vessel and into the lower liquid body. The gaseous fluids, with entrained liquids, are flowed in a generally longitudinal course within unit 6. Within unit 6 the fluids are divided into a series of parallel substantially unobstructed columnar paths to establish laminar flow.

Laminar flow suppresses turbulence within the body of fluids within unit 6. Deviation of the direction of fluid flow is kept to a minimum. The drops of liquids within the fluid body follow a predetermined trajectory and reach a surface of unit 6 to which they adhere and on which they collect. Passages isolated from the flow of gaseous fluids are provided to conduct the collected liquids into the body of liquids in the lower portion of the separator vessel. The gaseous fluid, freed of the liquid, flows out of the vessel. The liquids, freed of the gas, flows out of the vessel.

The plates of unit 6 may be of the Dixon plate configuration or the Lavery et al. patent configuration. In either, or any, event, the plates are generally in a plane and a series of them are sandwiched to form unit 6. The present invention is embodied in this sandwiching structure.

The cross-sectioned elevation of FIG. 2 shows unit 6 to be made up of a series of modules which are stacked to form the generally longitudinal courses required by the fluids flowing through the separator. Each module is provided with the cross-sectioned geometric shape which will fit the module into the assembly of unit 6. The modules are provided with connecting structure with which they can be readily bound together to form unit 6. Further, each module has a liquid drainage system which connects to the drainage system of its contiguous modules to conduct the liquids collected in each module to the liquid body 3 below the unit 6.

The disclosures of FIG. 2 and FIG. 3 overlap to some extent, but FIG. 3 expands the awareness of how the unit 6 of modules appears as it is mounted in vessel 1. The mounting of unit 6 on crossbars 20, 21 can be seen to better advantage in FIG. 3. Bars 20, 21 are simple support beams extending horizontally between walls of the vessel 1. Unit 6 is attachably mounted on these bars so the entire unit can be slipped into the position disclosed and, subsequently, removed for inspection, repair, cleaning or replacement.

To reduce the complexity of manufacture, the number of different cross-sectional shapes for modules 23 is limited. Both figures disclose a standard size in triangular cross-sectional shape and a second size in square shape is a possible solution to this problem. Combinations of these two module shapes substandtially fill the desired cress-sectional shape of vessel 1.

Of course, the final cross-sectional shape of the unit 6 is not a perfect fit into the cross-sectional shape of vessel 1. To obviate fluids by-passing the modules 23, obstructions are provided as attachments to the sides of unit 6. Filler plates 24 are connected as shown in both figures to extend to the vessel walls. These filler plates are flanged at 25 and bolted to adjacent modules. They complete the blocking of the cross-sectional area of the vessel interior and tie its attached modules together. The result is to leave the only route for the fluids passing through vessel 1 the passageways provided between the plates of the modules 23. FIG. 3, therefore, discloses the configuration of the modules 23 more completely, the relationships between the modules 23, the support of the unit 6 within vessel 1, and the role played by the filler plates 24.

More specifically, filler plates 24 are brought against ring pads 26 and 27 to fix the location of unit 6 on bars 20 and 21 and provide the desired peripheral seal to the wall of vessel 1. Ring pads 26 and 27 are welded to the internal wall of vessel 1. It is the sides of these ring pads 26 and 27 that contact the side of the filler plates 24, forming the seal and abutment.

Figure 4:
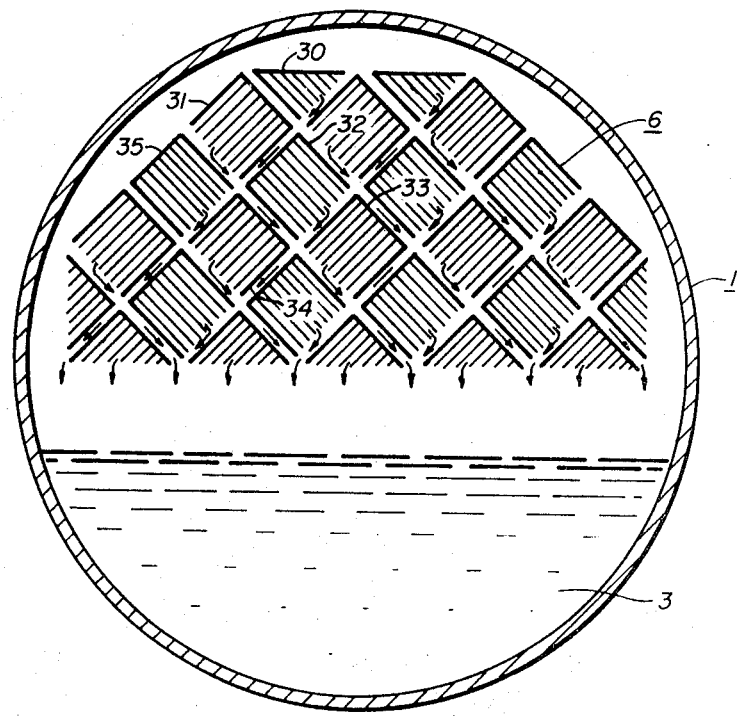
FIG. 4 is a diagrammatic representation of the FIG. 2 disclosure to indicate liquid flow patterns in the plate unit.

It is appropriate at this time to broadly disclose the liquid drainage pattern within unit 6. FIG. 4 is established to give a diagrammatic representation of the liquid flow from module to module, the liquid finally falling out the bottom of unit 6 into the lower collection 3. Obviously, other drawings can show more completely the drainage path for liquids within the modules which will isolate the liquids from the gaseous fluids flowing between the plates. Also, the connection of module drainage paths will be shown in greater detail. However, FIG. 4 does project the concept of liquid drainage out of each module, and from module to module, to final discharge from unit 6.

Figure 5:
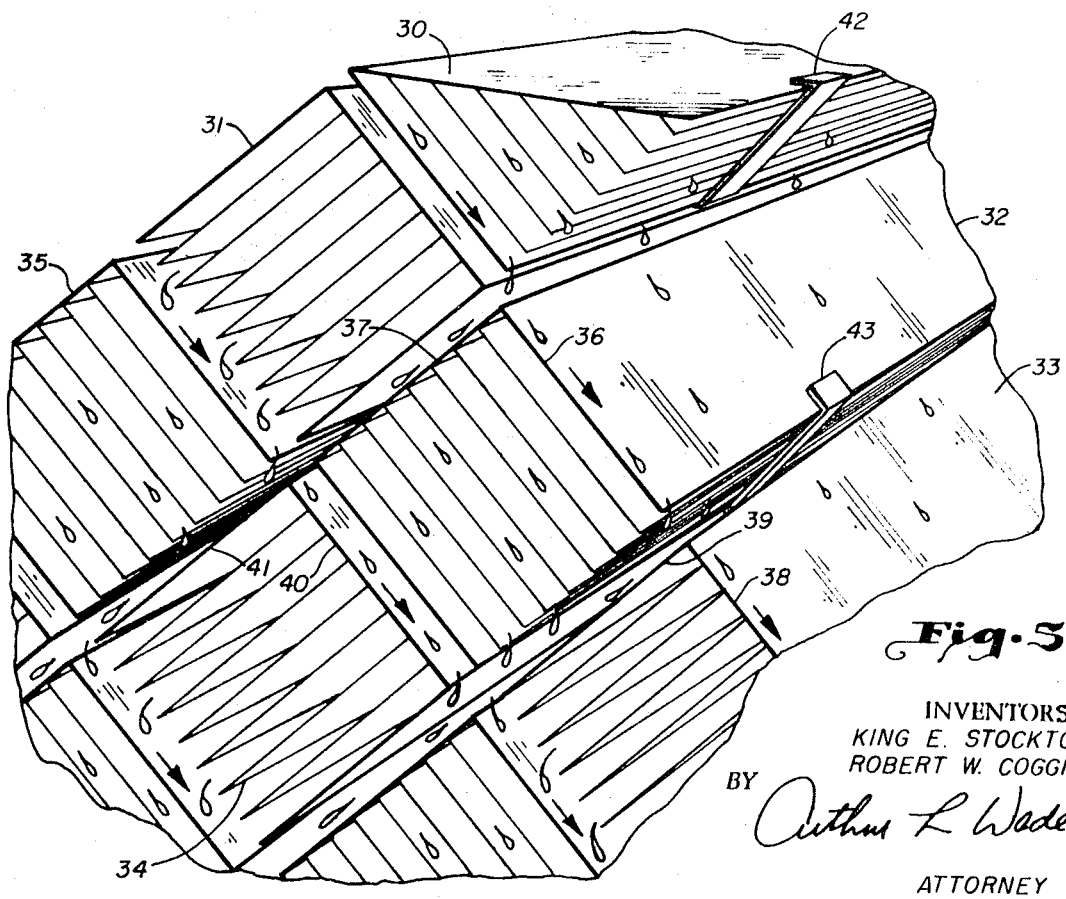
FIG. 5 is a diagrammatic perspective of a portion of the plate unit of FIG. 4.

FIG. 5 illustrates a selected number of the modules of FIG. 4, enlarged and placed in perspective. More specificalley, modules 30, 31, 32, 33, 34 and 35 are identified in each figure, to disclose the orientation of the plates within each module to carry out the drainage objectives of the invention.

Clarity is gained in FIG. 5 by not including the bands on each end of the modules and the spacers which keep the plates in parallel within their modules. In general, as far as drainage is concerned, each module has two outside plates joined at their upper edges to form a roof down which the collecting liquid travels toward the bottom. This generalization is not true with respect to the modules of triangular cross-section such as 30 because they need no roof of outside plates to form passages for liquid. However, all modules of square cross-sections, below the ones of triangular cross-sections, forms a roof with their outside plates which prevents the entry of liquid into the modules and therefore into the path of incoming fluids between the plates.

In FIG. 5, module 32 forms its roof with outside plates 36, 37. Module 33 has outside (roof) plates 38, 39. Module 34 has plates 40, 41. Each of these plates form the bottom of a passage for liquid flowing out of modules above it. Further, all the passages connect to conduct the liquid to the body 3 of liquid collected below the unit 6. FIG. 4 shows the flow pattern fairly well, if in somewhat diagrammatic form. FIG. 5 gives more specific information, illustrating representative drops of liquid coursing down the roof plates of their respective modules.

The connected passages between the modules are isolated from the flow of fluids normally flowing into the end of unit 6. The bands which capture the parallel module plates at each end of the modules act as a barrier to the incoming fluids. Therefore, re-entrainment of the liquids tracing the path defined by the passages between the modules is obviated. The fluids flowing into the modules of the unit 6 are limited to the passageways defined between the parallel plates within each module. The plates are oriented in one of two different directions, but each of the directions causes collected liquid to flow into the passageways, and subsequently, down to the collection 3.

Additional bracing for the plates of the modules is desirable. Straps 42 for the plates of module 30 represents this additional bracing. Strap 43 of module 32 forms a similar brace. Together with the end bands, the bracing illustrated forms each module into a building block, ready to be stacked with similar modules to form the unit 6.

Figure 6:
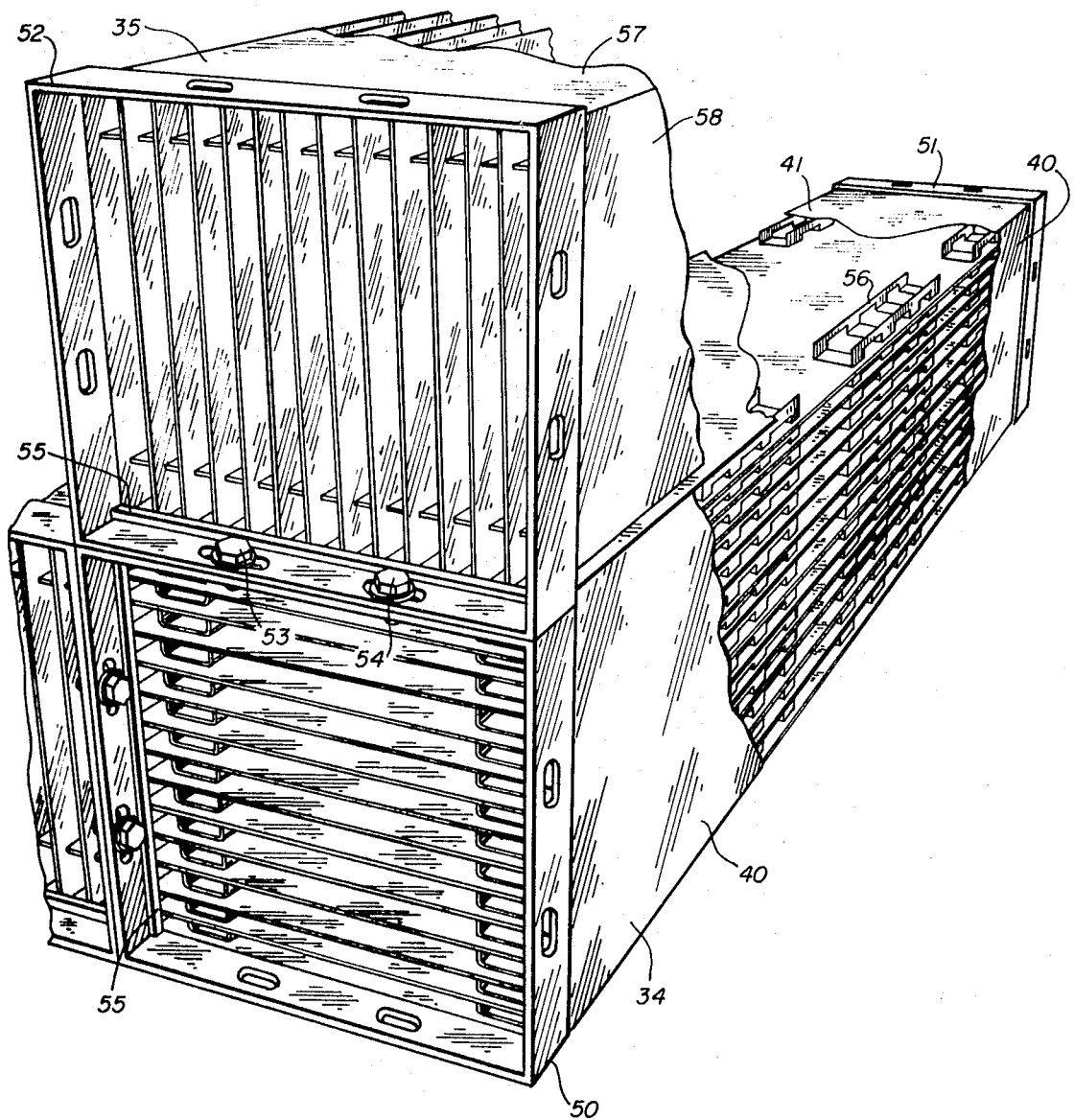
FIG. 6 is a sectioned perspective of several modules to illustrate how they fasten together into a unit.

FIG. 6 has been formed to illustrate specifically how the modules are attached to each other and how the plates are held in spatial relationship. Modules 34 and 35 were selected and properly sectioned to disclose all of the essential details of their construction.

Module 34 is shown with thirteen plates held together, at their ends by band 50 and band 51. Only band 52 of module 35 is disclosed, the far portion of the module being cut away to show the far portion of module 34 more completely.

Bands 50 and 52 are bolted together at 53 and 54. This is the simple connection means required to bring all the modules together in a unit. A bolt is inserted through aligned slots in the bands and a nut completes the connection. Other connecting structures can be used, but at the moment this is the more simple and practical embodiment of this concept of the invention.

The plates are inserted into the bands, or the bands slipped over the ends of the plates, depending upon the point of view selected. In either view the bands each have a bar, or ridge, 55 mounted on opposite internal walls of the bands against which the plates abut. In the view of modules 34 and 35 in FIG. 6, only one of these abutment structures is visible in each module end shown.

The module plates are relatively long, thin sheets requiring multi-point support along their lengths. Spacers 56 are provided along their lengths to give the needed support and maintain the distance between plates uniform. Many different shapes are probably satisfactory for spacers 56. The ones shown are generally provided the shape of a channel with transverse slots to enable liquid to readily flow transversely across the plates to the passage provided between modules.

The "roof" described supra is formed by plates 40, 41 for module 34 and plates 57, 58 for module 35. These plate pairs are joined together along thir abutting edges and welded to the bands to complete construction of the modules.

Under the concepts of the invention, we have disclosed a series of parallel separator plates, spaced from each other to provide elongated passages to control the Reynolds number of multi-phasic fluid flow, and banded at their ends into a module. The bands extend around the outside of the plate ends and have a stop within the bands to limit how far the plates extend into the bands. At least one outside plate is welded, or otherwise attached to the bands, to complete the capture of the plates. Some means of spacing the plates from each other within the module is provided. The result of bringing these elements together in a combination is a module which can be bolted to similar modules to form an internal unit for a separator.

The parallel plates of each module are positioned to drain their liquids downward. Each module has outside plates attached to each other to form a roof. The liquid falling from each module onto a lower module falls onto the roof of the lower module. The roofs then form the bottom of channels, or passages, between the modules which direct the liquids downward. As each group of module plates are spaced from adjacent groups of module plates by the bands, the bands become the closures for the passages at the ends of the modules. Therefore, the multi-phasic fluids are blocked from entering the intermodular passages and re-entrainment of liquid in these passages is obviated.

From the foregoing it will be seen that this invention is one well adapted to attain all of the ends and objects hereinabove set forth, together with other advantages which are obvious and inherent to the apparatus.

It will be understood that certain features and subcombinations are of utility and may be employed without reference to other features and subcombinations. This is contemplated by and is within the scope of the invention.

As many possible embodiments may be made of the invention without departing from the scope thereof, it is to be understood that all matter herein set forth or shown in the accompanying drawings is to be interpreted in an illustrative and not in a limiting sense.

The invention having been described, what is claimed is:
1. An article of manufacture, including,
a series of parallel fluid separator plates spaced from each other a predetermined distance, a band for each end of the series of plates, each band arranged peripherally about its end of the plate series,
a stop structure mounted on the interior surface of each band to capture its end of the plate series and limit the distance the plates extend into the band, and
a connection between the bands to complete a framework about the separator plates to form a module which can be manufactured separate from the vessel in which it is subsequently mounted.
2. The article defined by claim 1 in which,
a path for liquids is formed by the arrangement of plates within the module to maintain the liquids isolated from re-entrainment in fluids flowing between the plates.
3. The article defined by claim 1 in which,
the bands include structure by which the bands can be connected to the bands of similar modules, the modules provided with cross-sectional geometric shapes which enable the modules to be stacked and connected to form a unit with a predetermined fluid throughput capacity within the vessel in which the unit is mounted.
4. A unit of separator plates to be mounted in a vessel to divide fluids flowing through the vessel into a series of parallel substantially unobstructed columnar paths to bring about laminar flow of the fluids, including,
a plurality of modules stacked to provide a predetermined throughput of fluid through the modules as a unit with a desired approach to laminar flow, each module comprising:
 (a) a series of parallel plates spaced a predetermined distance apart, and
 (b) a band for each end of the series of plates arranged peripherally about the series;
means for mounting the unit in a vessel where multi-phasic fluids are forced to flow between the parallel plates, and
means for separately removing from the vessel the fluid phases separated in the unit.
5. A unit of separator plates adapted to be mounted in a vessel and provide a series of parallel substantially unobstructed columnar paths to create laminar flow of fluids flowing through the vessel, including,
a plurality of modules of parallel plates stacked to provide a unit with a predetermined throughput capacity of fluids with a desired approach to laminar flow, each module comprising:
 (a) a series of parallel plates spaced a predetermined distance apart,
 (b) a band arranged peripherally about each end of the series of plates, and
 (c) a pair of plates joined at one of their edges and to the bands to form a roof over the parallel plates and the bottom of connecting passages between the modules for liquid coursing out of the parallel plates and from module to module downward to a collection of liquid below the unit of modules.

References Cited
UNITED STATES PATENTS

| | | | |
|---|---|---|---|
| 1,567,313 | 12/1925 | Wilson et al. | 55—186 X |
| 2,349,944 | 5/1944 | Dixon | 55—1 |
| 2,656,896 | 10/1953 | Glasgow | 55—186 X |
| 3,413,778 | 12/1968 | Lavery et al. | 55—174 X |

REUBEN FRIEDMAN, Primary Examiner

R. W. BURKS, Assistant Examiner